United States Patent
Nguyen et al.

(10) Patent No.: US 9,720,847 B2
(45) Date of Patent: Aug. 1, 2017

(54) LEAST RECENTLY USED (LRU) CACHE REPLACEMENT IMPLEMENTATION USING A FIFO STORING INDICATIONS OF WHETHER A WAY OF THE CACHE WAS MOST RECENTLY ACCESSED

(71) Applicant: Freescale Semiconductor, Inc., Austin, TX (US)

(72) Inventors: Thang Q. Nguyen, Austin, TX (US); John D. Coddington, Cedar Park, TX (US); Sanjay R. Deshpande, Austin, TX (US)

(73) Assignee: NXP USA, INC., Austin, TX (US)

( * ) Notice: Subject to any disclaimer, the term of this patent is extended or adjusted under 35 U.S.C. 154(b) by 256 days.

(21) Appl. No.: 13/943,958

(22) Filed: Jul. 17, 2013

(65) Prior Publication Data

US 2015/0026410 A1 Jan. 22, 2015

(51) Int. Cl.
| | | |
|---|---|---|
| *G06F 12/00* | (2006.01) | |
| *G06F 12/122* | (2016.01) | |
| *G06F 12/0891* | (2016.01) | |
| *G06F 12/123* | (2016.01) | |
| *G06F 12/127* | (2016.01) | |
| *G06F 12/128* | (2016.01) | |
| *G06F 7/78* | (2006.01) | |

(52) U.S. Cl.
CPC ........ *G06F 12/122* (2013.01); *G06F 12/0891* (2013.01); *G06F 12/123* (2013.01); *G06F 12/127* (2013.01); *G06F 12/128* (2013.01); *G06F 7/78* (2013.01)

(58) Field of Classification Search
CPC .. G06F 12/122; G06F 12/123; G06F 12/0891; G06F 12/127; G06F 12/128; G06F 7/78
USPC ................. 711/136, 128, 133, 144
See application file for complete search history.

(56) References Cited

U.S. PATENT DOCUMENTS

| | | | |
|---|---|---|---|
| 5,353,425 A | 10/1994 | Malamy et al. | |
| 5,717,916 A * | 2/1998 | Verma | |
| 5,809,280 A * | 9/1998 | Chard et al. | 711/160 |
| 6,784,892 B1 * | 8/2004 | Munshi | 345/557 |
| 8,364,900 B2 | 1/2013 | Caprioli et al. | |
| 2002/0056025 A1 * | 5/2002 | Qiu et al. | 711/133 |
| 2005/0055511 A1 * | 3/2005 | Schreter | 711/134 |
| 2007/0271416 A1 | 11/2007 | Ahmed | |

(Continued)

OTHER PUBLICATIONS

H. Ghasemzadeh et al., Hardware Implementation of Stack-Based Replacement Algorithms, Proceedings of World Academy of Science,Engineering and Technology, vol. 16, Nov. 2006.

*Primary Examiner* — Hong Kim

(57) ABSTRACT

A method and apparatus for calculating a victim way that is always the least recently used way. More specifically, in an m-set, n-way set associative cache, each way in a cache set comprises a valid bit that indicates that the way contains valid data. The valid bit is set when a way is written and cleared upon being invalidated, e.g., via a snoop address, The cache system comprises a cache LRU circuit which comprises an LRU logic unit associated with each cache set. The LRU logic unit comprises a FIFO of n-depth (in certain embodiments, the depth corresponds to the number of ways in the cache) and m-width. The FIFO performs push, pop and collapse functions. Each entry in the FIFO contains the encoded way number that was last accessed.

18 Claims, 10 Drawing Sheets

(56) References Cited

U.S. PATENT DOCUMENTS

| | | | |
|---|---|---|---|
| 2008/0052469 A1* | 2/2008 | Fontenot et al. | 711/133 |
| 2012/0246410 A1* | 9/2012 | Xu | 711/128 |
| 2013/0297876 A1* | 11/2013 | Yu | 711/122 |
| 2014/0237195 A1* | 8/2014 | Holland | G06F 5/10 |
| | | | 711/147 |

* cited by examiner

| SET 0 | VALID0[0:n-1] | LRU0 | TAG0[0:n-1][0:k-1] | DATA0[0:n-1][0:p-1] |
| SET 1 | VALID1[0:n-1] | LRU1 | TAG1[0:n-1][0:k-1] | DATA1[0:n-1][0:p-1] |
| SET ... | VALID ...[0:n-1] | LRU ... | TAG ...[0:n-1][0:k-1] | DATA ...[0:n-1][0:p-1] |
| SET m-1 | VALID(m-1)[0:n-1] | LRU(m-1) | TAG(m-1)[0:n-1][0:k-1] | DATA(m-1)[0:n-1][0:p-1] |

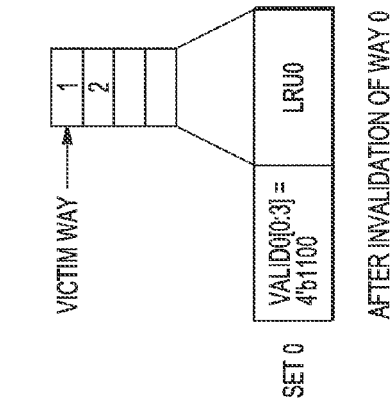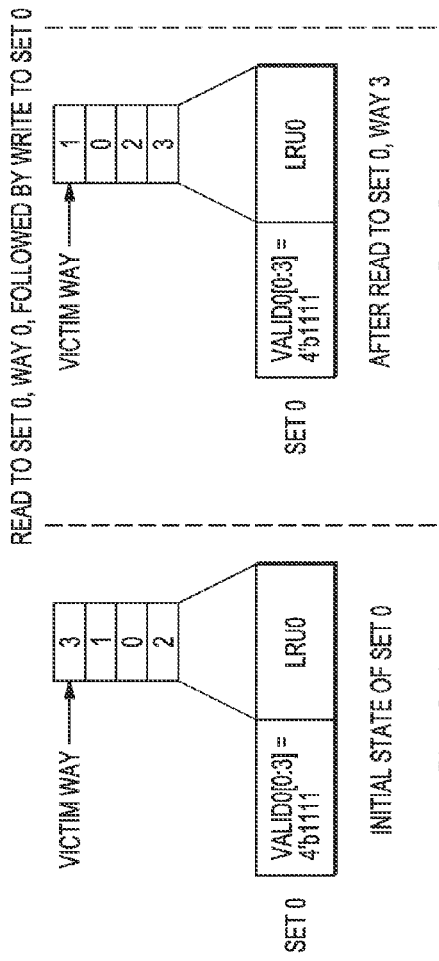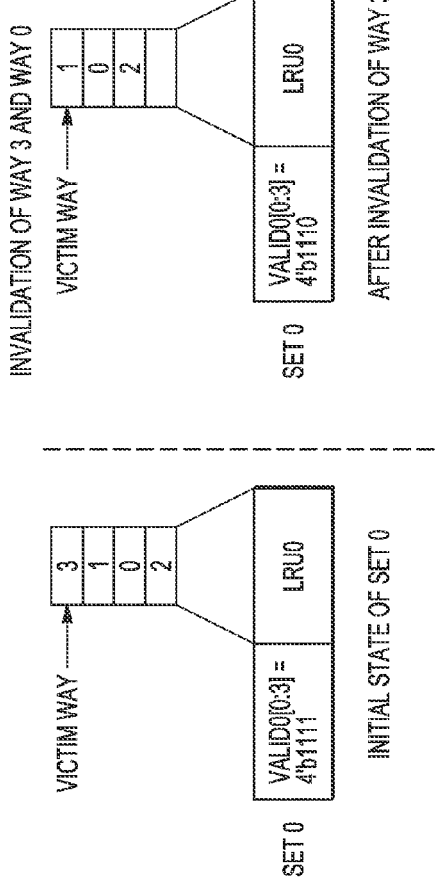

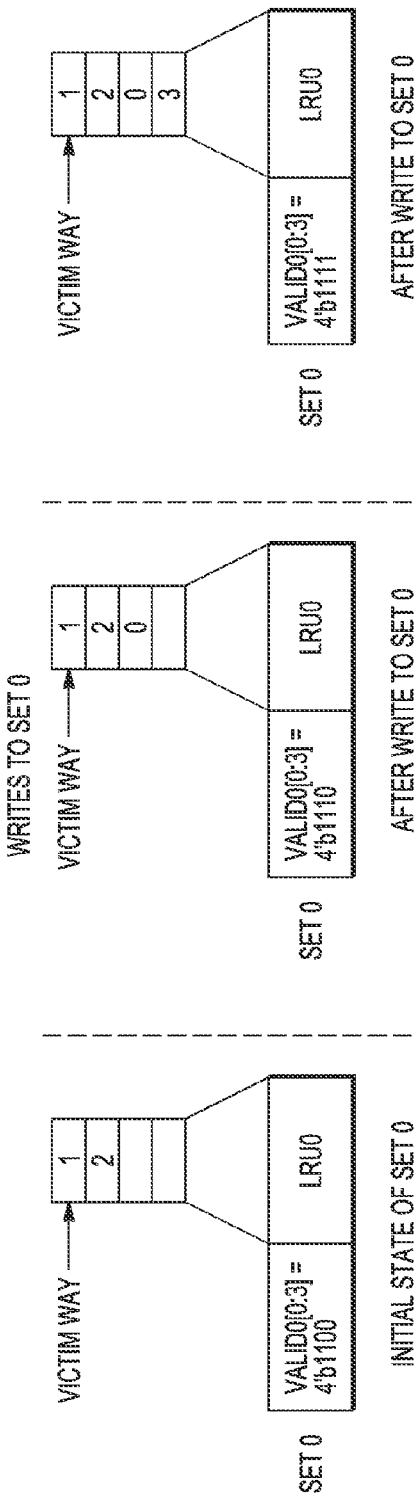
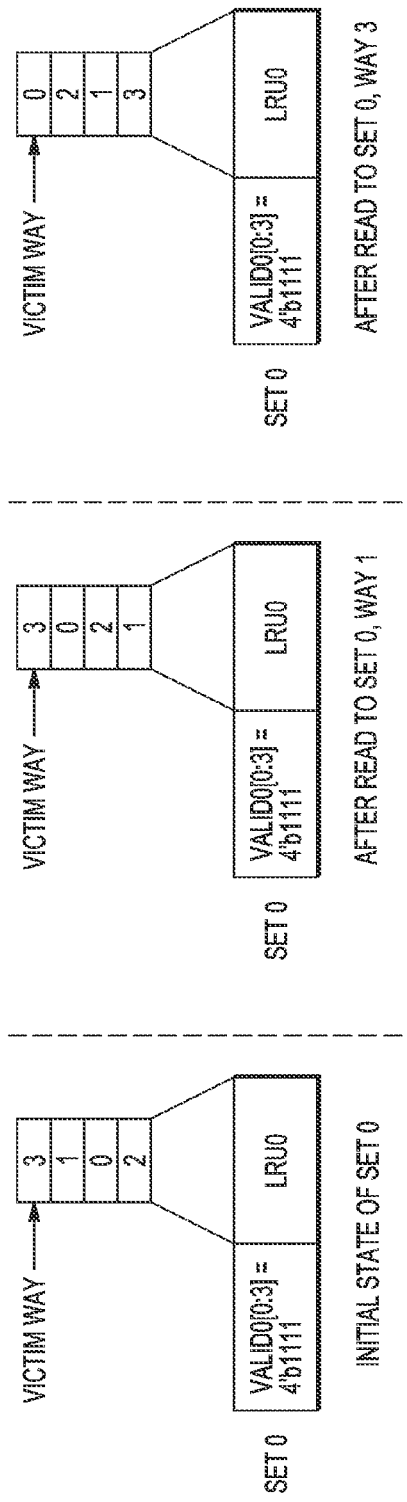

LEAST RECENTLY USED (LRU) CACHE REPLACEMENT IMPLEMENTATION USING A FIFO STORING INDICATIONS OF WHETHER A WAY OF THE CACHE WAS MOST RECENTLY ACCESSED

BACKGROUND OF THE INVENTION

The present invention relates in general to the field of cache memories and more particularly to cache replacement strategies used in cache memories.

DESCRIPTION OF THE RELATED ART

In general, data processing systems comprise a processor (often referred to as a central processing unit (CPU)) that executes instructions that are fetched from a main memory. One method to improve the performance of the processor is to use cache memory. Cache memory is high speed memory that works with the processor and the main memory to quickly provide information (e.g., instructions and/or data) to the processor. By using a cache architecture, a faster response time is possible than when the processor fetches all information directly from the main memory. The improved performance is possible because the cache usually contains the information that the processor is likely to request from memory. The cache is typically faster than the main memory; therefore, the cache can usually provide the data required by the processor much faster than the main memory. Part of the methodology used to load information into the cache is to predict and store the information that is frequently used by the processor and is likely to be used by the processor.

When the cache contains information requested by the processor, this is referred to as a cache hit. if the cache does not contain the information requested by the processor, then this is referred to as a cache miss. On a miss, the information is loaded from the main memory into the cache and is also provided to the processor. The information is loaded into the cache in anticipation that the processor will request the data in an upcoming bus cycle. This process continues throughout the operation of the data processing system.

Caches typically include a cache tag array and a cache data array. Each array is organized into a number of cache lines. Each cache line includes a tag portion (contained in the cache tag array)and a data portion contained in the cache data array). The tag value in a line is compared with the address of a memory request from the processor to determine whether the requested data is present in the data portion of that cache line, Validity information is associated with each cache line to indicate whether the line contains currently valid information and whether the information conforms to the information stored within the main memory (referred to as cache coherency). Caches are also typically arranged in sets to provide a set associative cache. A set associative cache is a hybrid between a fully associative cache (which required parallel searches of all slots within the cache), and direct mapped cache (which may cause collisions of addresses which are mapped to the same slot).

Because a cache is much smaller than main memory, the cache system often uses an algorithm to evict information from the cache to make way for new information fetched from main memory when the cache becomes full. One known cache replacement algorithm used is the least recently used (LRU) cache replacement algorithm in which the least recently used cache line (also referred to as the victim way) is evicted from the cache to make way for new information. With set associative cache structures, when a particular cache set is full (e.g., in some embodiments all ways of the set are valid), the LRU algorithm causes the least recently used way to be evicted for the particular cache set. Typically, rather than providing a true LRU algorithm, most known cache designs implement some type of pseudo-LRU algorithms. The issue relating to pseudo-LRU algorithms is that the victim way chosen is not necessarily always the least recently used way.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 9A, 9B, and 9C show an example of an LRU operation.

FIGS. 10A, 10B, and 10C show another example of an LRU operation.

FIGS. 11A, 11B, and 11C show another example of an LRU operation.

FIGS. 12A, 12B, and 12C show another example of an LRU operation.

DETAILED DESCRIPTION

In general, some embodiments of the present invention set forth a method and apparatus of a simple yet accurate method of calculating a victim way that is always the least recently used way.

More specifically, in certain embodiments, for an m-set, n-way set cache (such as a set associative cache), each way in a cache set comprises a valid bit that indicates that the way contains valid data. Valid bit is set when a way is written and cleared upon being invalidated, e.g., via a snoop address. The cache system comprises a cache replacement module, which in certain embodiments comprises an LAU logic unit associated with each cache set. The LRU logic unit comprises a FIFO of n-depth (in certain embodiments, the depth corresponds to the number of ways in the cache) and m-width. An entry at the top of the FIFO represents the least recently used entry white an entry at the bottom of the FIFO represents the most recently used entry. By providing LRU logic with a FIFO, the LRU control circuit efficiently calculates a victim section that is always the least recently accessed section where in certain embodiments, the calculating is performed in a single memory cycle.

The FIFO performs push, pop, collapse and collapse+push functions. A push function places an entry at the bottom of the FIFO. A pop function takes an entry from the top of the FIFO. A collapse function takes an entry from anywhere in the FIFO (a collapse function at the top of the FIFO is equivalent to a pop function). A collapse+push function takes an entry from somewhere in the FIFO and places the entry at the bottom of the FIFO, effectively making this entry the most recently used entry. In certain embodiments, with a collapse+push function, the collapse and push functions are performed together and concurrently. Each entry in the FIFO contains the encoded way number that was last accessed. A cache access can either be a read, a write or a snoop. A push to the FIFO is performed when an invalid cache way is written. A push and collapse of the FIFO are performed simultaneously and together when a valid cache way is read or written. A valid cache way is popped or collapsed when the way is invalidated. In certain embodiments, the LRU logic further comprises arbitration logic which selects a lowest available victim way number in a cache set for any cache writes when one or more cache ways are not valid. The LRU logic further comprises logic to decode read, write and snoop requests. When the FIFO is full, the victim way number is at the top of the FIFO. When the FIFO is not full, the victim way number is provided from the arbitration logic unit.

In various embodiments, the cache replacement module may be used in any set-associative cache hierarchies. Additionally, cache replacement module may be used in any other types of designs that have queues with a replacement requirement.

Figure 1:
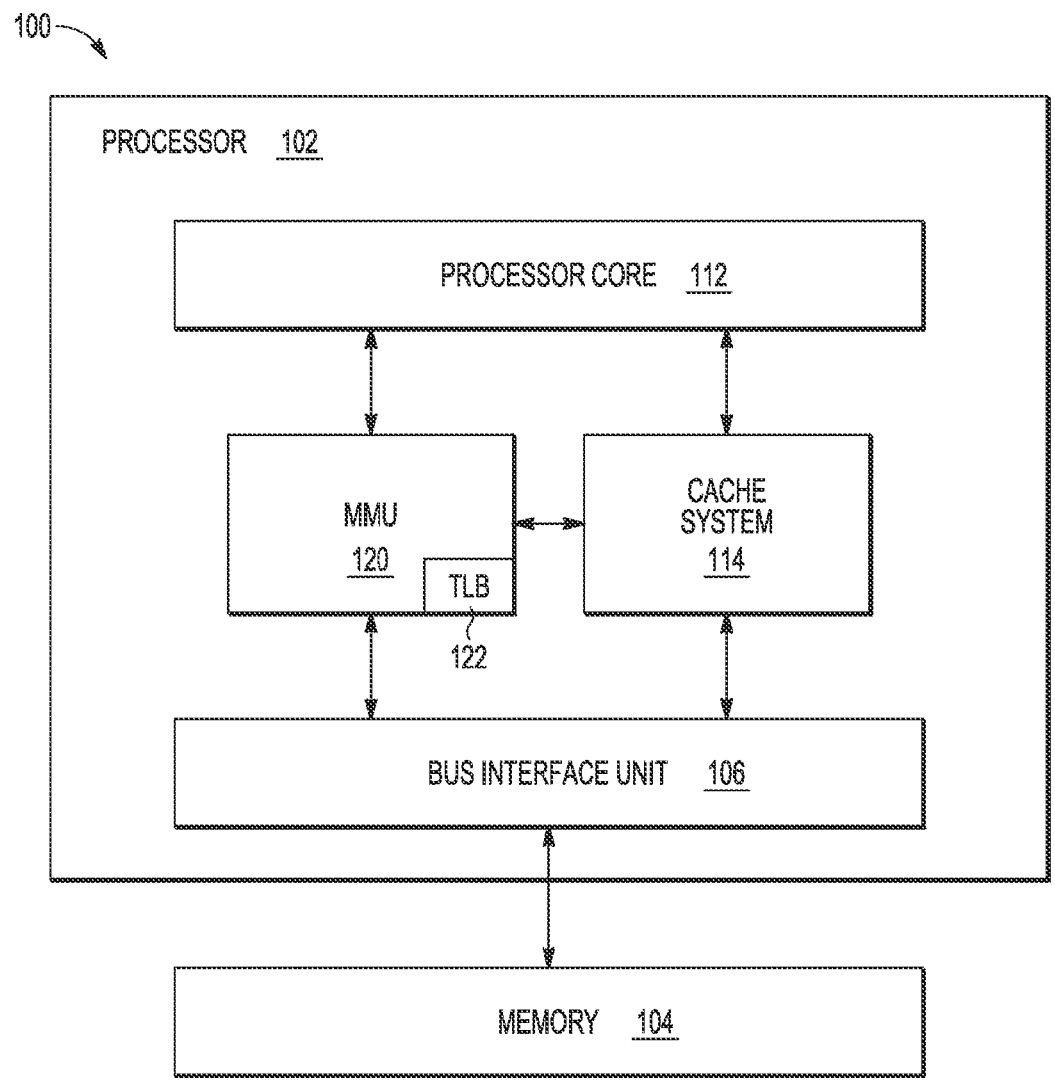
FIG. 1 shows a block diagram of a data processing system according to one embodiment of the present invention.

Referring to FIG. 1, a block diagram of a data processing system 100 is shown. The data processing system includes a processor 102 as well as a memory 104 and a bus interface unit 106. In one embodiment, the processor 102 includes at least one processor core 112 as well as a cache system 114. In other embodiments, the processor 102 may include multiple cores. It will be appreciated that while the data processing system 100 shows a single unified cache, separate instruction and data caches are contemplated. The processor 102 is coupled to the memory 104 via the bus interface unit 106. The memory 104 and the cache system 114 are managed by a memory management unit (MMU) 120. The MMU 120 includes a translation lookaside buffer (TLB) 122. The memory 104 includes one or more memory devices. The components of the data processing system 100 are coupled together by various buses used to pass control, address, and data signals.

Figure 2:
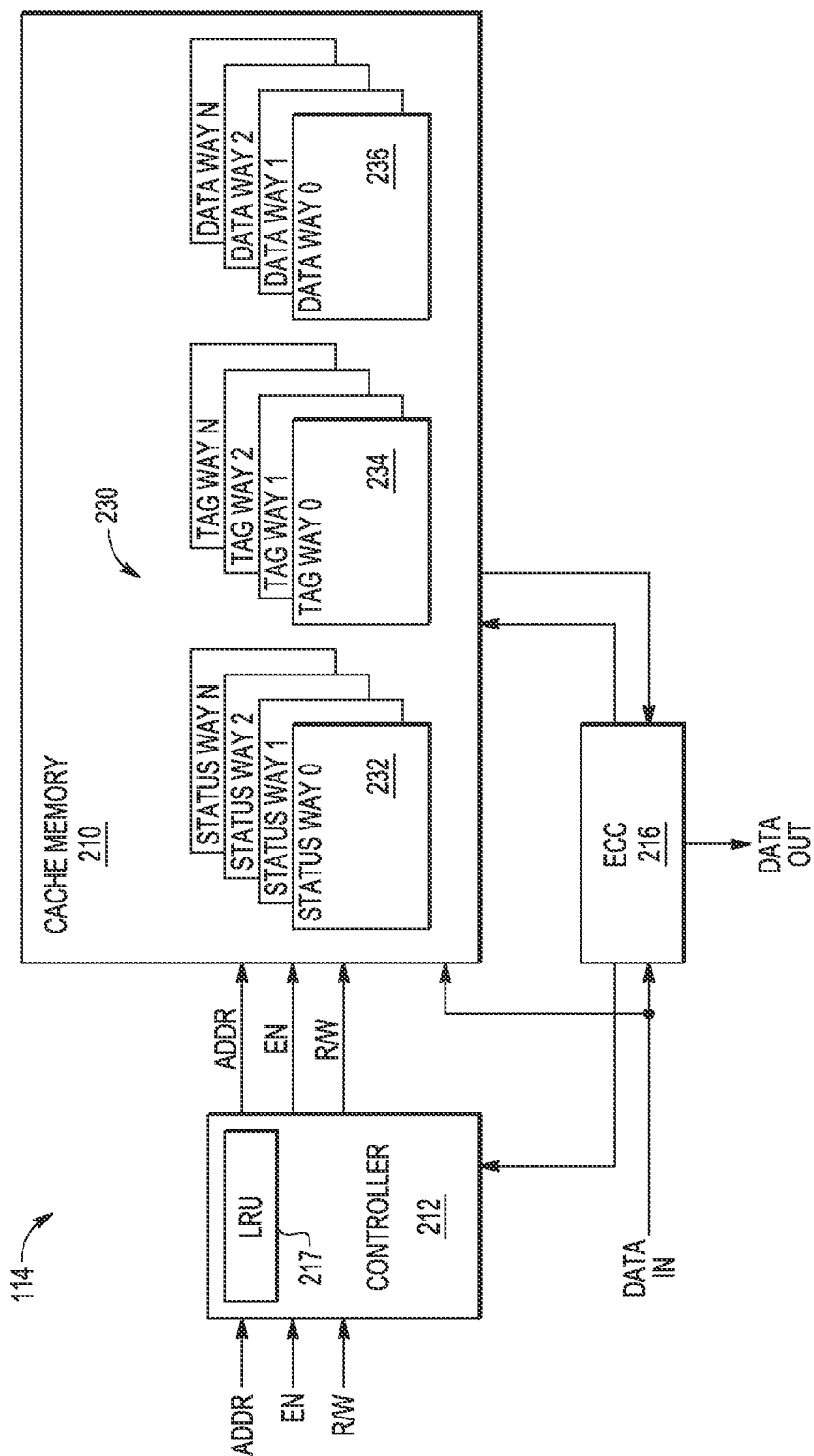
FIG. 2 shows a block diagram of a cache system.

Referring to FIG. 2, a block diagram of a cache system 114 is shown. The cache system 114 includes a cache memory 210 as welt as a controller 212 and error correction code (ECC) logic 216. The controller 212 further includes an LRU circuit 217.

The controller 212 receives an address signal (ADDR), an enable signal (EN) and a read/write signal (R/W), and provides the address signal, the enable signal, and the read/write signal to the cache memory 210. In certain embodiments, the controller 212 operates in accordance with a cache coherency protocol such as the MESI cache coherency protocol.

The ECC logic 216 provides and receives information from the cache memory 210. The ECC logic 216 also provides error information to the controller 212. More specifically, the ECC logic 216 receives a data input (e.g., an n-bit wide data input) from the data processing system 100 and generates a correction code based upon the data input (e.g., a k-bit wide correction code). The data input and the corresponding correction code are both provided to and stored within the cache memory 210 (e.g., an n+k bit wide input). The ECC logic 216 also receives data and correction code information from the cache memory 210 (e.g., an n+k bit wide data output) and generates a data output (e.g., an n-bit wide data output) after confirming that the data is correct based upon the correction code information. in certain embodiments, the ECC logic 216 uses a hamming code to provide single error correction and double error detection (SEC-DED).

The cache memory 210 includes a plurality of cache ways (also referred to as banks) 230 (WAY 0, WAY 1, WAY 2, WAY N). Each way 230 includes a plurality of cache lines. In certain embodiments, the cache ways 230 further include a plurality of status ways 232, a plurality of tag ways 234, and a plurality of data ways 236. The combination of the information from a line of the status ways 232, a line of the tag ways 234, and the data ways 236, provides a cache line. it will be appreciated that these ways may be separate or combined as a matter of design choice. In certain embodiments, the status ways store information used by the controller 212 to perform the MESI cache coherency protocol.

In general, when the processor core 112 makes a memory access request, the MMU 120 translates the virtual address of the request, via the TLB 122, and determines the corresponding physical address for the access. Note that some address requests contain the physical address directly, and do not require translation. The cache system 114 then determines whether the information requested by the processor core 112 is present in a line of cache memory 210 by comparing address information in the request to tag information in the tag array 234 as well as checking the line status (e.g., via the valid bits of the line) to assure that the information is valid. If the requested information is determined to be present in cache memory 210, the information read from the data array 236 is provided to the processor core 112. If the requested information is not present in the cache memory 210, the data processing system 100 accesses the memory 104 using the physical address determined via the TLB 122. The requested information is stored within the cache system 114 and is also provided to the processor core 112.

Figures 3, 4:
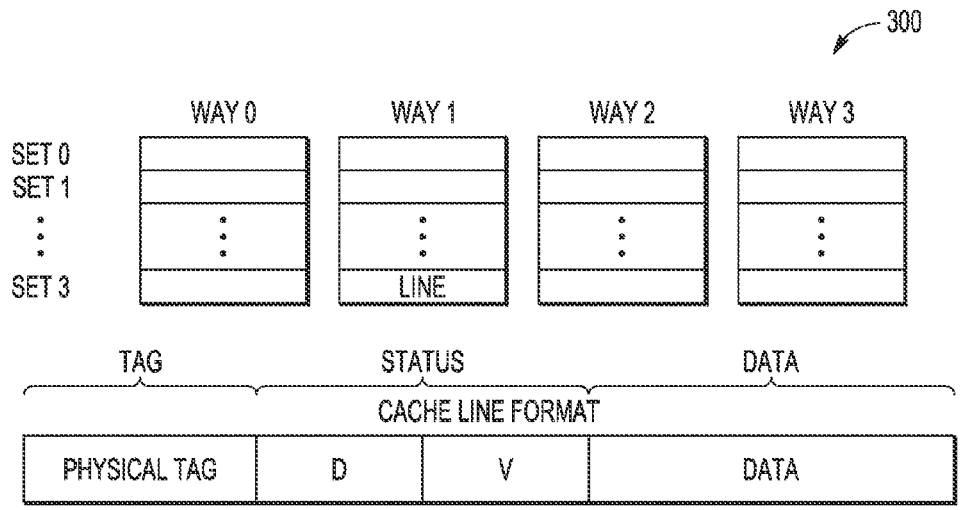
FIG. 3 shows a block diagram of the organization of a 4-way associative cache.
FIG. 4 shows a block diagram of a cache structure of an m-set, n-way cache view containing LRU and valid hits.

Referring to FIG. 3, a block diagram showing the organization of a 4-way associative cache 300 used in one embodiment of the present invention is shown. Other cache organizations or other types of associative caches are also contemplated. FIG. 3 shows a cache having 4 ways (WAY 0, WAY 1, WAY 2, and WAY 3) (e.g., portions), each having 4 sets (SET 0, SET 1, . . . SET 3) (e.g., sections). For each set, there are 4 cache lines, one corresponding to each way. Each cache line includes a tag portion (Tag) and a data portion (Data). Any data stored in the cache system 114 is contained in one of the lines.

Each line also includes an address tag (TAG) which corresponds to the address of the data contained in the blocks. Each line also includes a valid bit V which signifies whether or not the data portion contains valid information. Each line also includes a dirty bit D which is set to "1" when the data contained in the line has been modified by the processor (i.e., the line contains modified data) and is therefore not consistent with the information in the corresponding physical memory location. If the data in a line is "dirty," the modified data is eventually written to the physical memory location. This process is referred to as "copyback."

Referring to FIG. 4, a block diagram of the cache structure for an m-set, n-way cache view containing LRU and valid bits is shown. More specifically, the cache structure comprises an entry for each set of the cache. Each entry further comprises a valid portion, an LRU number portion, a tag portion, and a data portion. The valid portion comprises valid bits corresponding to each way (Valid0[0:n−1], Valid 1[0:n−1], Valid2[0:n−1], Valid3[0:n−1]). The LRU number portion comprises an LRU number entry (LRU0, LRU1, LRU2, LRU(M−1). The LRU number entry indicates that there is an LRU unit per cache set. Thus, if there are 256 sets, then there are 256 separate LRU units in which each LRU unit has a corresponding FIFO. The tag portion comprises tag entries corresponding to each way (TAG0[0:n−1][0:k−1], TAG1[0:n−1][0:k−1], TAG2[0:n−1][0:k−1], TAG (m−1)[0:n−1][0:k−1]). The data portion comprises data entries corresponding to each way (Data0[0:n−1][0:p−1], Data1[0:n−1][0:p−1], Data2[0:n−1][0:p−1], Data(m−1)[0:n−1][0:p−1]).

Figure 5:
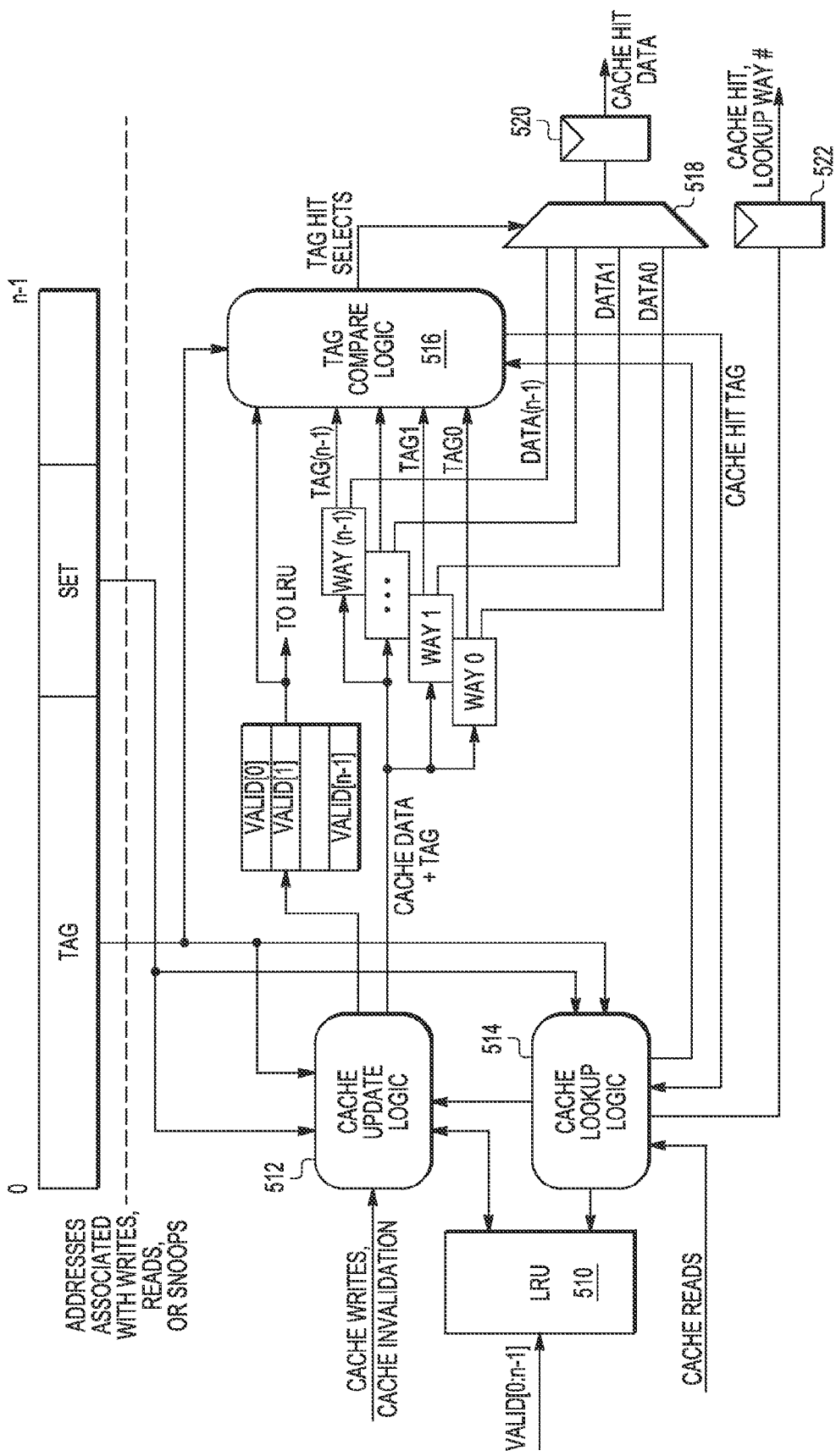
FIG. 5 shows a block diagram of portions of the controller interacting with a cache set.

FIG. 5 shows a block diagram of an LRU circuit 217 of the controller 212 interacting with a cache set of the cache 210. More specifically, the controller 212 further includes LRU logic 510, cache update logic 512, cache lookup logic 514, tag compare logic 516, and multiplexer 518, as well as register 520, 522.

The LRU logic 510 receives from and provides information to the cache update logic 512, receives information from the cache lookup logic 514, as well as the valid bits from each set. The cache update logic 512 also receives an input from the cache lookup logic 514, cache write information, and cache invalidation information as well as the set information for addresses associated with writes or reads. The cache update logic 512 provides outputs to the valid bits of each way as well as cache data and tag data to each way.

The cache lookup logic 514 receives cache read information and cache hit tag indication as well as the tag information and set information for addresses associated with writes or reads. The cache lookup logic 514 generates cache hit and lookup way number information which is provided to register 522. The cache lookup logic 514 also provides an input to the tag compare logic 516.

The tag compare logic 516 receives inputs from each of the valid bits of each way as well as the tag data of each way. The tag compare logic 516 also receives the tag information for addresses associated with writes or reads. The tag compare logic 516 generates a tag hit select output which is provided to multiplexer 518. The multiplexer 518 also receives cache data from each way. The multiplexer provides the selected input as an output to register 520 which provides the cache hit data as an output.

Figure 6:
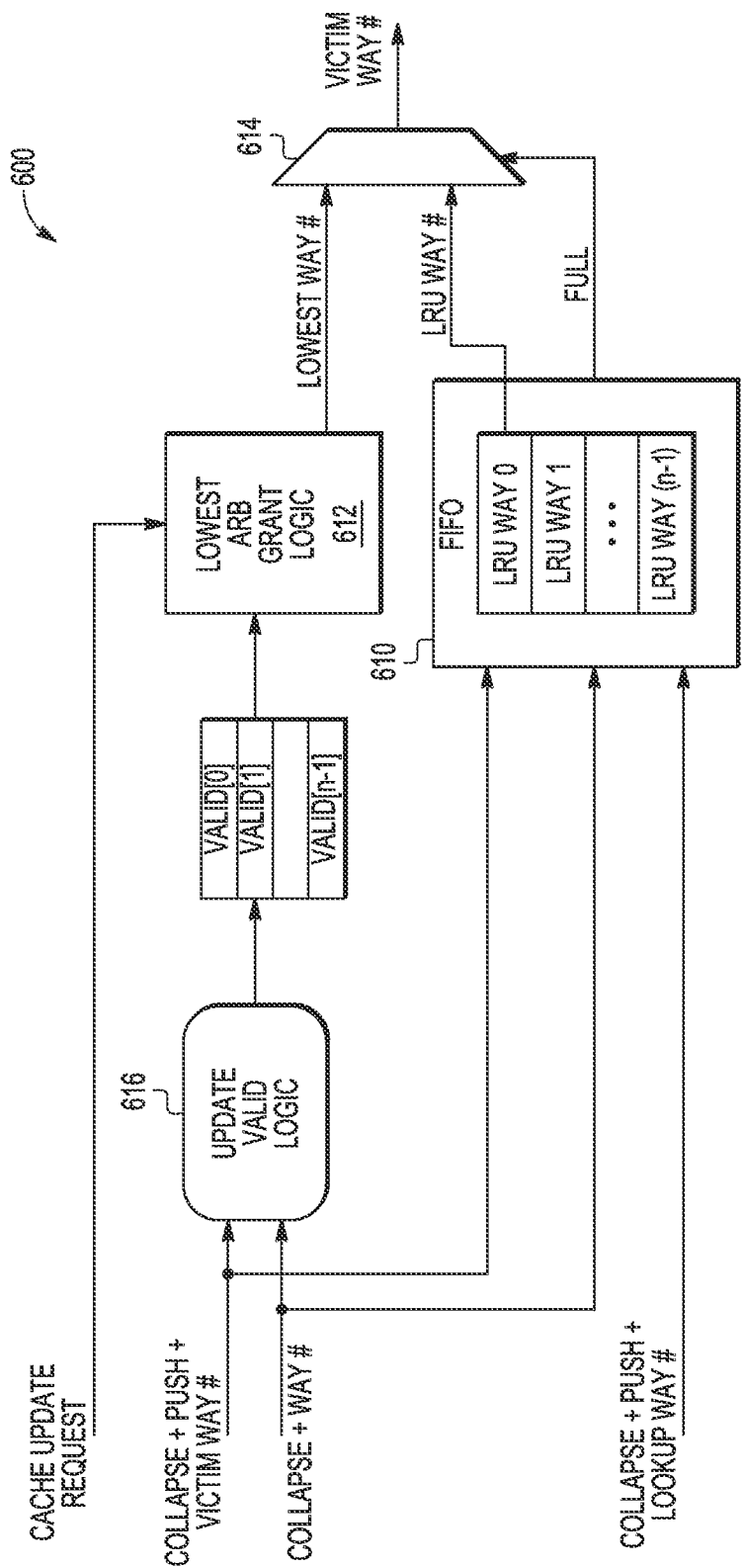
FIG. 6 shows a block diagram of an LRU circuit on a per set basis.

FIG. 6 shows a block diagram of an LRU circuit 510 on a per set basis. More specifically, the LRU logic comprises a FIFO 610 (i.e., a FIFO circuit), arbitration logic 612 (i.e., an arbitration circuit), and multiplexer 614 as well as update valid logic 616. The FIFO 610 comprises a plurality of entries (LRU WAY0, WAY1, LRU WAY1, . . . LRU WAY (n−1)). In certain embodiments, the number of entries in the FIFO corresponds to the number of ways in the cache.

The FIFO 610 receives a collapse, push, lookup way number signal (COLLAPSE+PUSH+LOOKUP WAY #), a collapse, way number signal (COLLAPSE+WAY #) and a collapse, push, victim way number signal (COLLAPSE+PUSH+VICTIM WAY #), The FIFO generates an LRU way number signal (LRU WAY #) and a full signal (FULL). The arbitration logic 612 receives a cache update request signal as well as the valid bits for each way. The arbitration logic 612 generates a lowest way number signal (LOWEST WAY #). The multiplexer 614 receives the lowest way number signal, the LRU way number signal, and the full signal. The update valid logic 616 receives a collapse, way number signal (COLLAPSE+WAY #) and a collapse, push, victim way number signal (COLLAPSE+PUSH+VICTIM WAY #). The update valid logic 616 provides inputs to the valid bits of each way.

Figure 7:
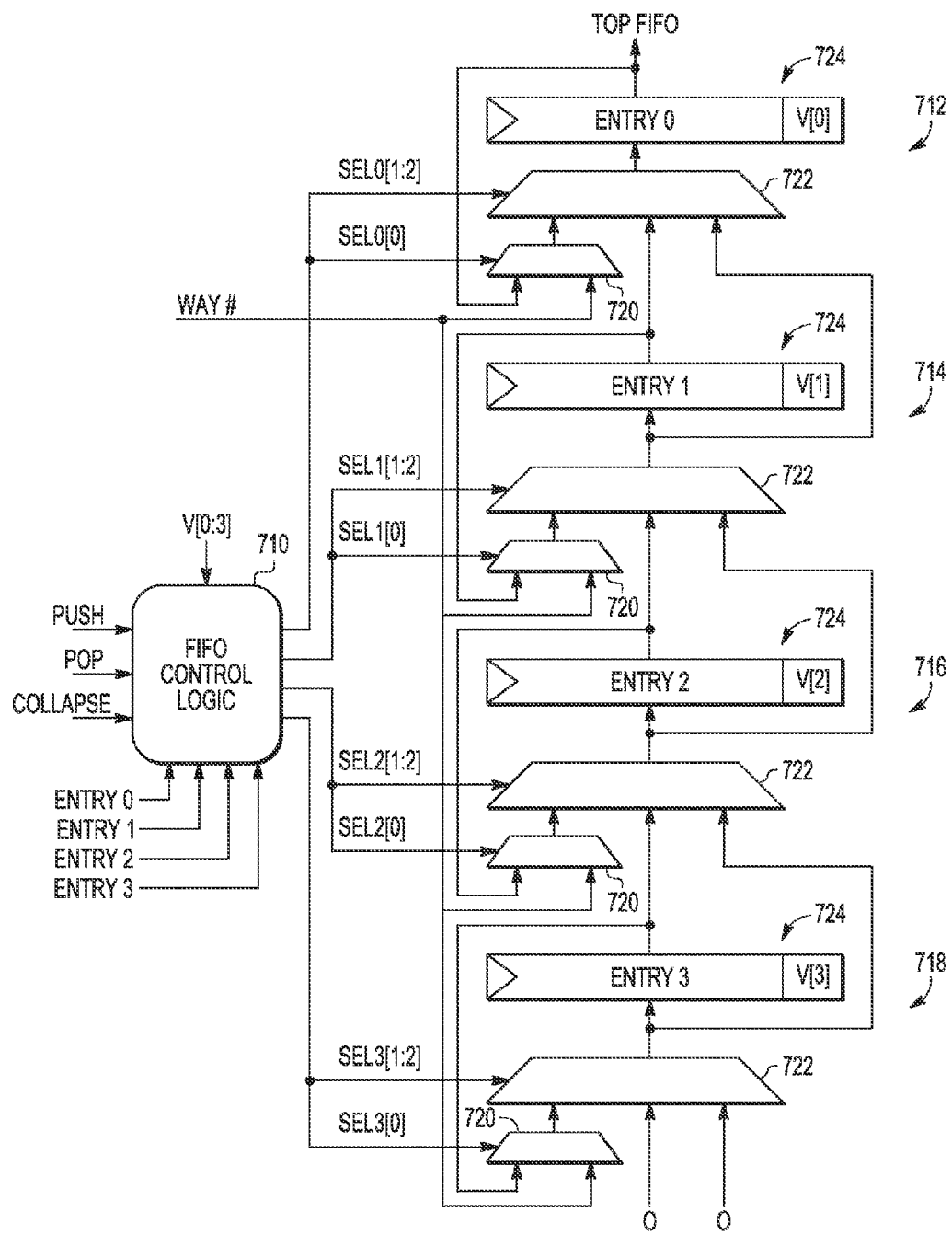
FIG. 7 shows a block diagram of a 4-entry collapsible FIFO.

FIG. 7 shows a block diagram of a 4-entry collapsible FIFO which is one example of the FIFO 610. More specifically, the FIFO includes FIFO control logic 710 as well as four FIFO entries 712, 714, 716, 718, corresponding to entry 0, entry 1, entry 2, and entry 3, respectively. Each FIFO entry includes a first multiplexer 720, a second multiplexer 722, and a storage portion 724. The storage portion 724 stores an encoded way number as a FIFO entry as well as a corresponding valid bit. I.e., FIFO entry 0 stores FIFO entry 0 as well as valid bit 0, FIFO entry 1 stores FIFO entry 1 as well as valid bit 1, etc.

The FIFO control logic 610 receives a push signal, a pop signal and a collapse signal as well as valid bits (0-3). The FIFO control logic 710 also receives FIFO entry signals (ENTRY0, ENTRY1, ENTRY2, ENTRY3). The FIFO control logic 710 generates a plurality of select signals (SEL0[0], SEL0[1:2], SEL1[0], SEL1[1:2], SEL2[0], SEL2[1:2] and SEL3[0], SEL3[1:2]) which are provided to the respective FIFO entries 712, 714, 716, 718 to control the operation of the FIFO entries. I.e., the SEL0 select signals are provided to FIFO entry 0, the SEL1 select signals are provided to FIFO entry 1, etc. The FIFO entries 712, 714, 716, 718 also receive a way number signal (WAY #).

The FIFO 610 performs push, pop, collapse and collapse+push functions. A push function places an entry at the bottom of the FIFO 610 (e.g., FIFO entry 3). A pop function takes an entry from the top of the FIFO 610 (e.g., FIFO entry 0). A collapse function takes an entry from anywhere in the FIFO 610 (a collapse function at the top of the FIFO is equivalent to a pop function). A collapsed-push function takes an entry from somewhere in the FIFO 610 and places the entry at the bottom of the FIFO 610 (e.g., FIFO entry 3 effectively making this entry the most recently used entry. In certain embodiments, with a collapse+push function, the collapse and push functions are performed together and concurrently. Each entry 712, 714, 716, 718 in the FIFO contains the encoded way number that was last accessed. The FIFO entry signals (ENTRY0, ENTRY1, ENTRY2, ENTRY3 ) allow the FIFO control logic 710 to control which way to collapse, Thus, the way that is being updated or invalidated is compared against each entry in the FIFO and based upon the FIFO entry signals the FIFO control logic 610, generates a signal to cause a pop or collapse function to be performed for the entry being updated as well as the appropriate function for all entries below the entry being updated in the FIFO.

Figure 8:
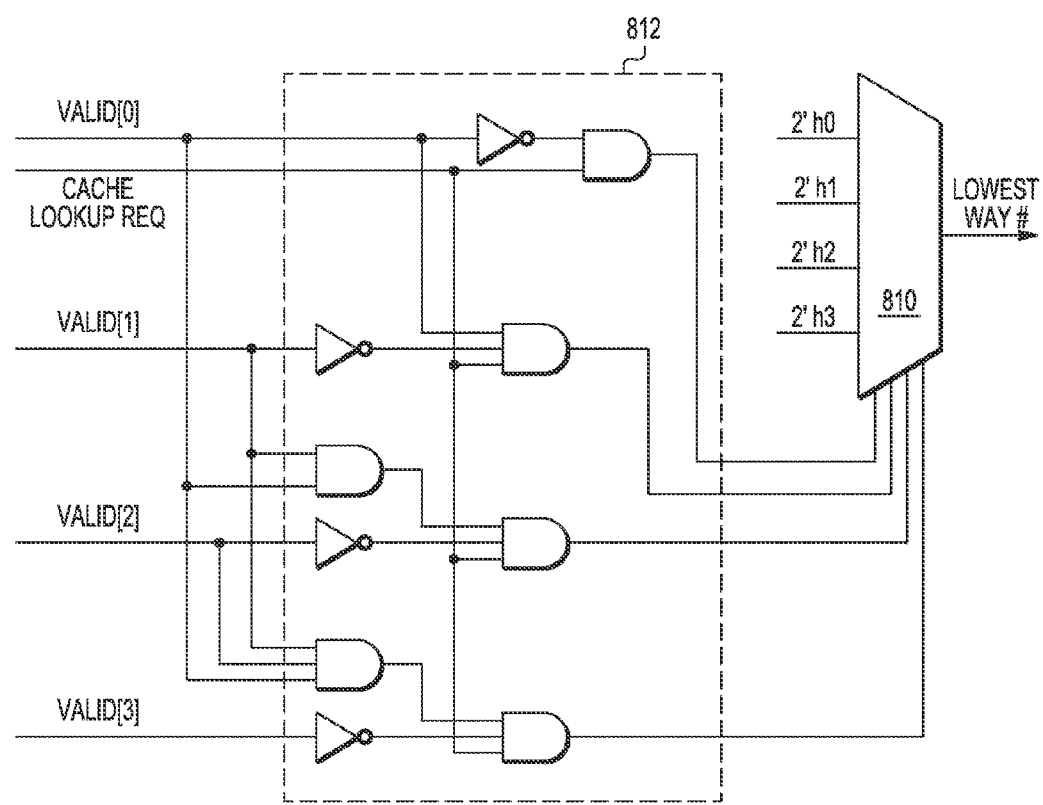
FIG. 8 shows a block diagram of arbitration logic of the LRU logic.

FIG. 8 shows a block diagram of arbitration logic of the LRU logic which is one example of arbitration logic 612. More specifically, the arbitration logic includes a multiplexer 810 as well as control logic 812. The control logic 812 receives the valid bits (e.g., valid[0]-valid[3] for a four way implementation) as well as a cache lookup control signal (CACHE LOOKUP REQ) and controls the multiplexer 810 to provide entry identifiers 0-3 (2'h0, 2'h1, 2'h2, 2'h3) as the lowest way number when the FIFO is not full. The arbitration logic 612 provides a lowest victim way number that is used when the FIFO is not full. The arbitration logic derives this information directly from the valid bits of the respective entries, where valid bit valid[0] is represented as entry 0 (2'h0), valid bit valid[1] is represented as 2'h1, etc. When the FIFO is not full (i.e., not all valid bits within the FIFO are set), then the arbitration logic 612 identifies the lowest available way as the victim way. The identification is performed based upon the valid bits of the respective ways. For example, if the current valid bits [0:3] are 1110, then only way 3 is empty (i.e., available) as valid[3] is set as invalid. In this case, way 3 is identified as the victim way by returning the entry identifier value 2'h3. Alternately for example, if the current valid bits are 1010, then there are two empty ways (ways 1 and 3). In this case, the arbitration logic identifies the lowest way and thus the way 1 is identified as the victim way by returning the entry identifier 2'h1.

FIGS. 9A, 9B, and 9C show an example of an LRU operation for a 2-set, 4-way set associative cache. More specifically, FIGS. 9A, 9B, and 9C show an example of a read to set 0, way 0 followed by a write to set 0. Because this example neither reads nor writes from set 1, the set 1 FIFO is unaffected by the operations in this example. In this example, referring to FIG. 9A, the initial example state of the FIFO is FIFO entry 0 stores way entry number 3, FIFO entry 1 stores way entry number 1, FIFO entry 2 stores way entry number 0 and FIFO entry 3 stores way entry number 2. Additionally, the four binary valid bits for set 0 are all set (e.g., VALID0[0:3]=4'b1111).

Next referring to FIG. 9B, after a read to set 0, way 3, the state of the FIFO is FIFO entry 0 stores way entry number 1, FIFO entry 1 stores way entry number 0, FIFO entry 2 stores way entry number 2 and FIFO entry 3 stores way entry number 3. Additionally, the four binary valid bits for set 0 are all set (e.g., VALID0[0:3]=4'b1111). Thus, the FIFO performed a collapse and push operation of FIFO entry 0. With the collapse and push operation of FIFO entry 0, the FIFO entry 0 was removed, the FIFO entry 1 was progressed from FIFO entry 1 to FIFO entry 0, FIFO entry 2 was progressed from FIFO entry 2 to FIFO entry 1, FIFO entry 2 was progressed from FIFO entry 1 to FIFO entry 2, FIFO entry 3 was progressed from FIFO entry 3 to FIFO entry 2 and way entry number 3 was stored to FIFO entry 3.

Next referring to FIG. 9C, after a write to set 0 (which is stored in FIFO entry 1), the state of the FIFO is FIFO entry 0 stores way entry number 0, FIFO entry 1 stores way entry number 2, FIFO entry 2 stores way entry number 3 and FIFO entry 3 stores way entry number 1. Additionally, the four binary valid bits for set 0 are all set (e.g., VALID0[0:3] = 4'b1111). Thus, the FIFO performed a collapse and push operation of FIFO entry 0. With the collapse and push operation of FIFO entry 0, the value stored in FIFO entry 0 was removed, the FIFO entry 1 was progressed from FIFO entry 1 to FIFO entry 0, FIFO entry 2 was progressed from FIFO entry 2 to FIFO entry 1, the FIFO entry 3 was progressed from FIFO entry 3 to FIFO entry 2 and way entry number 1 was stored to FIFO entry 3. In this operation, way entry number 1 thus becomes the least recently used entry and way entry 0 becomes the most recently used entry.

FIGS. 10A, 10B, and 10C show another example of an LRU operation for a 2-set, 4-way set associative cache. More specifically, FIGS. 10A, 10B, and 10C show an example of an invalidation of way 3 and way 0. Because this example neither reads nor writes from set 1, the set 1 FIFO is unaffected by the operations in this example. In this example, referring to FIG. 10A, the initial example state of the FIFO is FIFO entry 0 stores way entry number 3, FIFO entry 1 stores way entry number 1, FIFO entry 2 stores way entry number 0 and FIFO entry 3 stores way entry number 2. Additionally, the four binary valid bits for set 0 are all set (e.g., VALID0[0:3]=4'b1111).

Next referring to FIG. 10B, after an invalidation of way 3, the state of the FIFO is FIFO entry 0 stores way entry number 1, FIFO entry 1 stores way entry number 0, FIFO entry 2 stores way entry number 2 and FIFO entry 3 is empty (i.e., no valid information is stored within FIFO entry 3). Additionally, three of the four binary valid bits for set 0 are set valid while the fourth binary valid bit is set invalid (e.g., VALID0[0:3]=4'b1110). Thus, the FIFO performed a collapse operation of FIFO entry 0. With the collapse operation of FIFO entry 0, the FIFO entry 0 was removed, the FIFO entry 1 was progressed from FIFO entry 1 to FIFO entry 0, FIFO entry 2 was progressed from FIFO entry 2 to FIFO entry 1, and FIFO entry 3 was progressed from FIFO entry 3 to FIFO entry 2. No information is stored to FIFO entry 3.

Next referring to FIG. 10C, after an invalidation of way 0 (which is stored in FIFO entry 1), the state of the FIFO is FIFO entry 0 stores way entry number 1, FIFO entry 1 stores way entry number 2, FIFO entries 2 and 3 are empty. Additionally, two of the four binary valid bits for set 0 are set valid while the third and the forth binary valid bits are set invalid (e.g., VALID0[0:3]=4'b1100), Thus, the FIFO performed a collapse operation of FIFO entry 1. With the collapse operation of FIFO entry 1, the value stored in FIFO entry 1 was removed and the FIFO entry 2 was progressed from FIFO entry 2 to FIFO entry 1. No information is stored to FIFO entries 2 and 3.

FIGS. 11A, 11B, and 11C show another example of an LRU operation for a 2-set, 4-way set associative cache. More specifically, FIGS. 11A, 11B and 11C show an example of writes to set 0. Because this example neither reads nor writes from set 1, the set 1 FIFO is unaffected by the operations in this example. In this example, referring to FIG. 11A, the initial example state of the FIFO is FIFO entry 0 stores way entry number 1 and FIFO entry 1 stores way entry number 2. Additionally, the two of the four binary valid bits for set 0 are set valid while the third and forth binary valid bit is set invalid (e.g., VALID0[0:3]=4'b11100).

Next referring to FIG. 11B, after a write to set 0, way 0, the state of the FIFO is FIFO entry 0 stores way entry number 1, FIFO entry 1 stores way entry number 2, FIFO entry 2 stores way entry number 0 and FIFO entry 3 is empty. Additionally, three of the four binary valid bits for set 0 are set valid while the forth binary valid bit is set invalid (e.g., VALID00[0:3]=4'b1110).

Next referring to FIG. 11C, after another write to set 0, way 3, the state of the FIFO is FIFO entry 0 stores way entry number 1, FIFO entry 1 stores way entry number 2, FIFO entry 2 stores way entry number 0 and FIFO entry 3 stores way entry number 3. Additionally, the four binary valid bits fir set 0 are all set (e.g., VALID0[0:3]=4'b1111).

FIGS. 12A, 12B, and 12C show another example of an LRU operation for a 2-set, 4-way set associative cache. More specifically, FIGS. 12A, 12B, and 12C show an example of a read to set 0, way 1 followed by a read to set 0, way 3. Because this example neither reads nor writes from set 1, the set 1 FIFO is unaffected by the operations in this example. In this example, referring to FIG. 12A, the initial example state of the FIFO is FIFO entry 0 stores way entry number 3, FIFO entry 1 stores way entry number 1, FIFO entry 2 stores way entry number 0 and FIFO entry 3 stores way entry number 2. Additionally, the four binary valid bits for set 0 are all set (e.g., VALID0[0:3]=4'b1111).

Next referring to FIG. 12B, after a read to set 0, way 1, the state of the FIFO is FIFO entry 0 stores way entry number 3, FIFO entry 1 stores way entry number 0, FIFO entry 2 stores way entry number 2 and FIFO entry 3 stores way entry number 1. Additionally, the four binary valid bits for set 0 are all set (e.g., VALID0[0:3]=4'b1111). Thus, the FIFO performed a collapse and push operation of FIFO entry 1. With the collapse and push operation of FIFO entry 1, the FIFO entry 1 was removed, the FIFO entry 2 was progressed from FIFO entry 2 to FIFO entry 1, FIFO entry 3 was progressed from FIFO entry 3 to FIFO entry 2, and way entry number 1 was stored to FIFO entry 3.

Next referring to FIG. 12C, after a read to set 0, way 3 (which is stored in FIFO entry 0), the state of the FIFO is FIFO entry 0 stores way entry number 0, FIFO entry 1 stores way entry number 2, FIFO entry 2 stores way entry number 1 and FIFO entry 3 stores way entry number 3. Additionally, the four binary valid bits for set 0 are all set (e.g., VALID0[0:3]=4'b1111). With the collapse and push operation of FIFO entry 0, the FIFO entry 0 was removed, the FIFO entry 1 was progressed from FIFO entry 1 to FIFO entry 0, FIFO entry 2 was progressed from FIFO entry 2 to FIFO entry 1, and FIFO entry 3 was progressed from FIFO entry 3 to FIFO entry 2 and FIFO entry 3 stores way entry number 3.

Figures 13A, 13B, 13C:
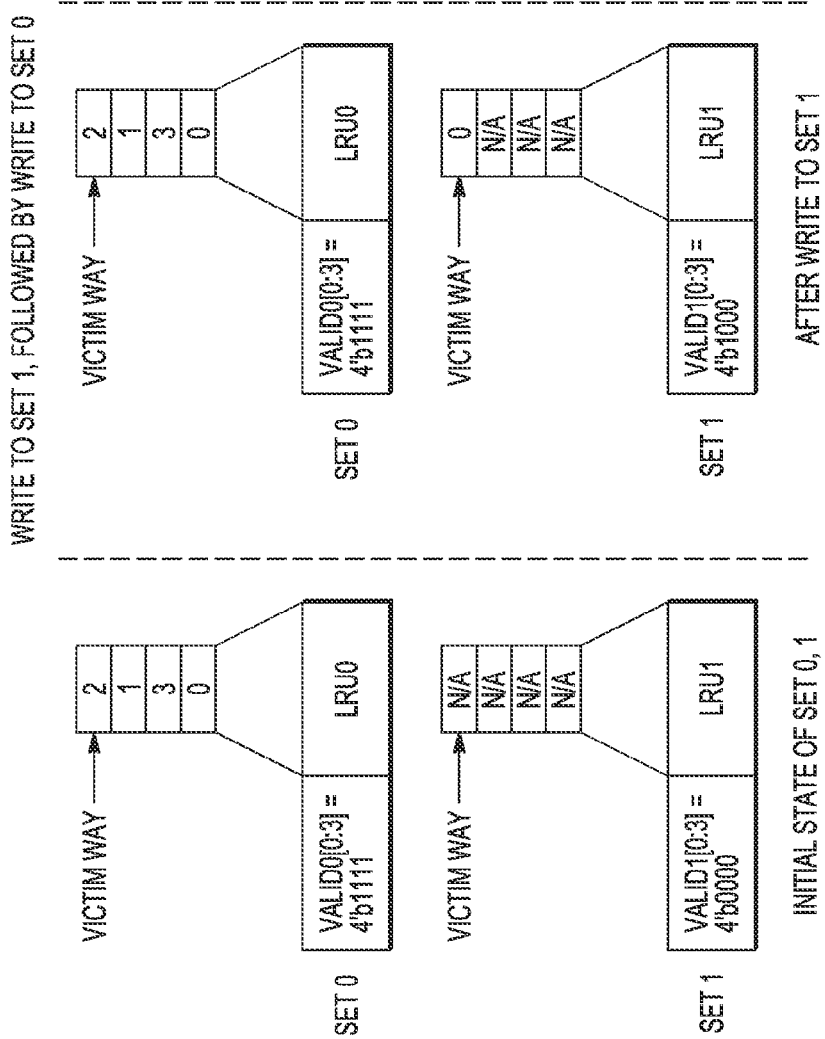
FIGS. 13A, 13B, and 13C show another example of an LRU operation.

FIGS. 13A, 13B, and 13C show another example of an LRU operation for a 2-set, 4-way set associative cache. More specifically, FIGS. 13A, 13B, and 13C show an example of a write to set 1 followed by a write to set 0. in this example, referring to FIG. 13A, the initial example state of the set 0 FIFO is set 0 FIFO entry 0 stores way entry number 2, set 0 FIFO entry 1 stores way entry number 1, set 0 FIFO entry 2 stores way entry number 3 and set 0 FIFO entry 3 stores way entry number 0. Additionally, the four binary valid bits for set 0 are set valid (e.g., VALID0[0:3]=4'b1111). The initial example state of the set 1 FIFO is set 0 FIFO entries 0, 1, 2 and 3 are all empty (e.g., not applicable). Additionally, the four binary valid bits for set 1 are set invalid (e.g., VALID1[0:3]=4'b0000).

Next referring to FIG. 13B, after a write to set 1, the state of the set 0 FIFO is set 0 FIFO entry 0 stores way entry number 2, set 0 FIFO entry 1 stores way entry number 1, set 0 FIFO entry 2. stores way entry number 3 and set 0 FIFO entry 3 stores way entry number 0. Additionally, the four binary valid bits for set 0 are set valid (e.g., VALID0[0:3]=4'b1111). The state of the set 1 FIFO is set 0 FIFO entries 0 stores set 1 way entry 0. Additionally, the states of set 1 FIFO entries 1, 2 and 3 are all empty (e.g., not applicable). Additionally, one of the four binary valid bits for set 1 is set valid and the remaining valid bits for set 1 are set invalid (e.g., VALID1[0:3]4'b1000), Next referring to FIG. 13C, after a write to set 0, the state of the set 0 FIFO is set 0 FIFO entry 0 stores way entry number 1, set 0 FIFO entry 1 stores way entry number 3, set 0 FIFO entry 2 stores way entry number 0 and FIFO entry 3 stores way entry number 3. Additionally, the four binary valid bits for set 0 are all set (e.g., VALID0[0:3]=4'b1111). Thus, the set 0 FIFO performed a collapse and push operation of FIFO entry 0. The state of the set 1 FIFO is set 0 FIFO entries 0 stores set 1 way entry 0. Additionally, the states of set 1 FIFO entries 1, 2 and 3 are all empty (e.g., not applicable). Additionally, one of the four binary valid bits for set 1 is set valid and the remaining valid bits for set 1 are set invalid VALID1[0:3]=4'b1000).

Various illustrative embodiments have been described in detail with reference to the accompanying figures. While various details are set forth in the description, it will be appreciated that the present invention may be practiced without these specific details, and that numerous implementation-specific decisions may be made to the invention described herein to achieve the device designer's specific goals, such as compliance with process technology and design-related constraints, which will vary from one implementation to another. White such a development effort might be complex and time-consuming, it would nevertheless be a routine undertaking for those of ordinary skill in the art having the benefit of this disclosure. For example, selected aspects are shown in block diagram form, rather than in detail, to avoid limiting or obscuring the present invention. Also for example, while the data processing system is shown with a processor having a particular architecture with a single core, other processor architectures are contemplated, including multicore type processor architectures. Also for example, various types of cache storage units such as ways, banks, way unit blocks, sets and groups of bitcells may each be considered to be sections within the cache.

For example, while the FIFO has been described using performing collapse and push operations, it will be appreciated that under certain conditions, a collapse and push operation is functionally equivalent to a pop operation.

Additionally, for example, while a 3:1 FIFO has been described which includes three input multiplexers, it will be appreciated that a 2:1 FIFO may also be used in which case two input multiplexers are sufficient. With the three input multiplexers of the described FIFO, collapse, push and pop functions can all be performed in the same cycle. However, in certain embodiments only pushing, collapsing and collapsing and pushing are performed in the same cycle, in which case a 2:1 FIFO is sufficient.

Consequently, the invention is intended to be limited only by the spirit and scope of the appended claims, giving full cognizance to equivalents in all respects.

What is claimed is:

1. A memory system comprising:
  a memory array, the memory array comprising a plurality of portions and a plurality of sections, the portions corresponding to ways within the memory array and sections corresponding to sets within the memory array; and,
  a memory controller, the memory controller comprising a least recently used (LRU) circuit, the LRU circuit comprising a plurality of first in first out (FIFO) circuits, each of the plurality of FIFO circuits storing indications of a respective portion of the plurality of portions in an order based upon whether the respective portion of the plurality of portions was most recently accessed; and wherein
  each of the plurality of FIFO circuits is configured to perform a collapse function based upon the indications of a respective portion of the plurality of portions in the order based upon whether the respective portion of the plurality of portions was most recently accessed, the collapse function allowing each of the plurality of FIFO circuits to provide a true LRU function to the LRU circuit such that a victim portion is always a last recently used portion.

2. The memory system of claim 1 wherein:
  at least one of a pop function and a collapse function is performed by the FIFO circuit when a portion is invalidated.

3. The memory system of claim 1 wherein:
  a push function is performed by the FIFO circuit when an invalid portion is written; and,
  a push and collapse function is performed by the FIFO circuit simultaneously and together when a valid portion is read or written.

4. The memory system of claim 3 wherein:
  each entry in the FIFO comprises a portion number indication relating to when the portion stored within the entry was last accessed.

5. The memory system of claim 1 wherein:
each portion of the cache comprises a valid bit, the valid bit indicating that a portion of the cache comprises valid data, the valid bit being set when the portion is written and cleared upon being invalidated.

6. The memory system of claim 1 wherein:
the memory array comprises an m-set, n-way set associative cache;
the memory controller comprises m LRU circuits corresponding to each set of the memory array.

7. The memory system of claim 6 wherein:
each of the m LRU circuits comprise a respective first in first out (FIFO) circuit, each FIFO circuit being of n-depth, each FIFO circuit storing at least some of the plurality of ways in an order based upon whether a way of the plurality of ways was most recently accessed.

8. The memory system of claim 7 wherein:
each entry in each of the FIFO circuits comprises a way number indication relating to when the way stored within the entry was last accessed via at least one of a read or a write operation.

9. The memory system of claim 1 further comprising:
an arbitration circuit, the arbitration circuit selecting a lowest available victim portion number in a set for any writes when one or more cache portions are not valid.

10. A method for performing a least recently used section replacement operation comprising:
determining a victim portion of a memory array comprising a plurality of portions and a plurality of sections, the portions corresponding to ways within the memory array and sections corresponding to sets within the memory array via a least recently used (LRU) control circuit, the LRU circuit comprising a plurality of first in first out (FIFO) circuits, each of the plurality of FIFO circuits storing indications of a respective portion of the plurality of portions in an order based upon whether a the respective portion of the plurality of portions was most recently accessed; and,
performing a collapse function via at least one of the plurality of FIFO circuits based upon the indications of a respective portion of the plurality of portions in the order based upon whether the respective portion of the plurality of portions was most recently accessed, the collapse function allowing the each of the plurality of FIFO circuits to provide a true LRU function to the LRU circuit such that a victim portion is always a last recently used portion.

11. The method of claim 10 further comprising:
performing a push function via the FIFO circuit when an invalid portion is written; and,
performing a push and collapse function via the FIFO circuit simultaneously and together when a valid portion is read or written.

12. The method of claim 10 further comprising:
performing at least one of a pop function and a collapse function via the FIFO circuit when a section is invalidated.

13. The method of claim 10 wherein:
each entry in the FIFO comprises a portion number indication relating to when the portion stored within the entry was last accessed.

14. The method of claim 13 wherein:
each portion of the cache comprises a valid bit, the valid bit indicating that a portion of the cache comprises valid data, the valid bit being set when the portion is written and cleared upon being invalidated.

15. The method of claim 10 wherein:
the memory array comprises an m-set, n-way set associative cache;
the memory controller comprises m LRU circuits corresponding to each set of the memory array.

16. The method of claim 15 wherein:
each of the m LRU circuits comprise a respective first in first out (FIFO) circuit, each FIFO circuit being of n-depth, each FIFO circuit storing at least some of the plurality of ways in an order based upon whether a way of the plurality of ways was most recently accessed.

17. The method of claim 16 wherein:
each entry in each of the FIFO circuits comprises a way number indication relating to when the way stored within the entry was last accessed via at least one of a read or a write operation.

18. The method of claim 10 further comprising:
selecting a lowest available victim portion number via an arbitration circuit for any writes when one or more cache ways are not valid.

* * * * *